US008289881B2

(12) United States Patent  
Tsai

(10) Patent No.: US 8,289,881 B2  
(45) Date of Patent: Oct. 16, 2012

(54) SCALABLE SOLUTIONS FOR IP RIGIDITY

(76) Inventor: Wei Kang Tsai, Irvine, CA (US)

( * ) Notice: Subject to any disclaimer, the term of this patent is extended or adjusted under 35 U.S.C. 154(b) by 407 days.

(21) Appl. No.: 12/583,608

(22) Filed: Aug. 24, 2009

(65) Prior Publication Data

US 2011/0044204 A1     Feb. 24, 2011

(51) Int. Cl.
*H04L 12/28*     (2006.01)
*H04L 12/56*     (2006.01)

(52) U.S. Cl. ......................................... 370/254; 370/401

(58) Field of Classification Search .................. 370/254, 370/255, 389, 392, 401
See application file for complete search history.

(56) References Cited

U.S. PATENT DOCUMENTS

2003/0007461 A1*   1/2003   Chen et al. ..................... 370/254
2007/0260678 A1*   11/2007   Fukui et al. .................... 709/203
2008/0253373 A1*   10/2008   Ros-Giralt et al. ........... 370/392

\* cited by examiner

*Primary Examiner* — Hong Cho

(57) ABSTRACT

An overlay network of connection ID (called CID) processing nodes, called C-nodes, is deployed to solve joint IP mobility, NAT traversal, and path identity problems, in a unified framework. The CIDs can either be globally unique or unique at local C-nodes. CIDs can be modified along a path, and each connection is enabled to send packets in multiple paths via multiple IP networks. It is also possible to direct a path to traverse through a particular node. Double-sided/single-sided mobility, with double-sided/single-sided NAT traversal problems are solved using C-nodes deployed as terminal software, gateways, or relays.

6 Claims, 4 Drawing Sheets

| C-node ID | C-node IP address | | | |
|---|---|---|---|---|
| CID-In | CID-out | T-in | T-out | PO/CO code |
| 1 | 1 | (xx,xx,xx,xx) | (xx,xx,xx,xx) | xx,xx |
| 1 | 1 | (xx,xx,xx,xx) | (xx,xx,xx,xx) | xx,xx |
| 22 | 20 | (xx,xx,xx,xx) | (xx,xx,xx,xx) | xx,xx |
| 55 | 121 | (xx,xx,xx,xx) | (xx,xx,xx,xx) | xx,xx |
| — | 24 | (xx,xx,xx,xx) | (xx,xx,xx,xx) | (insert CID,xx) |
| 77 | — | (xx,xx,xx,xx) | (xx,xx,xx,xx) | (remove CID,xx) |
| — | — | — | — | — |

SCALABLE SOLUTIONS FOR IP RIGIDITY

FIELD OF THE INVENTION

The present invention relates in general, to IP (Internet protocol) rigidity problems, and more particularly, to solutions for mobility, NAT (network address translation) traversal, and path-identity problems in IP networks.

BACKGROUND OF THE INVENTION

Like all good technologies, IP is now aged and badly needs a major upgrade. Today, IP is used for purposes far more than it was originally intended. One major set of problems has been known as IP rigidity.

The first IP rigidity problem is rooted in IP's failure to distinguish between location identity and host identity, called host-location confusion (HLC). In IP, a single IP address is used to identify both a host and its point of attachment. This design assumes a host never moves; a host is uniquely identified by its permanent point of attachment. However, once a host is to change its attachment point, connections to the host will break. This problem cannot be understated; today, IP addresses do change all the time.

Changes in IP address arise from two possible sources: mobility and NAT.

As a host moves to a new location, the IP address for the host must update accordingly to route packets correctly. In IP, a connection is identified by a tetrad (4-tuple): source IP address, source port number, destination IP address, and destination port number. Hereafter, an IP address-port pair will simply be called an AP; a source AP will be called a SAP, and a destination AP will be called a DAP. Thus, a tetrad is an ordered pair formed by a SAP and a DAP.

An AP is a route identifier. An IP address tells a router where to forward an IP packet, and a port number tells a network stack which socket to forward a packet. Therefore, in IP, a connection ID is also a route ID. If one endpoint moves, while the connection remains alive, the route to connect the endpoints has to change. Then a dilemma arises: the connection ID must remain unchanged while the route ID has to change; but they are tied at the hip! This is the classic mobility problem that has plagued the IP world for many years.

Next, a host behind a NAT is given a private IP address. In crossing a NAT, the SAP (for private-to-public traversal) or DAP (for public-to-private traversal) of a packet is modified by the NAT. This creates a blindness problem: a host cannot recognize its source or destination behind a NAT. Since a NAT is often integrated with a firewall, more problems are present. Packets are subject to deep packet inspection and filtering executed by a firewall. Therefore, packets may fail to survive a NAT/firewall traversal. Hereafter, a NAT is assumed to be a NAT-firewall combination.

Today, due to compelling reasons, NAT is deemed to be absolutely necessary; massive NAT deployments will continue into foreseeable future. The problems resulted from NAT have also plagued the IP world continuously. These problems are collectively known as the NAT traversal (NT) problem.

The next IP rigidity problem is rooted in IP's inability to explicitly identify a path, called PIA (path identification ambiguity). In IP, paths are implicitly identified and packets in the same connection travel in a single path. These and other rigidities cause many traffic engineering (TE) problems. For example, the classic fish problem in routing has never been solved elegantly. To solve this and other TE problems, a simple solution is to send packets in a single connection in multiple paths, which is impossible in IP. Without explicit path identification, IP routing is inflexible and will remain problematic.

Multi-path routing in the same connection has an added benefit. In a converged network formed by multiple communication channels, a host should consolidate all channels within a single IP connection, to maximize bandwidth usage. For example, a smart phone with dual antennas for Wi-Fi and 3G should utilize both bandwidths for a single application. Path rigidity problems will be referred to as the path-identity problem.

In sum, there are two root causes for IP rigidity, HLC and PIA. They together cause the mobility problem, the NT problem, and the path-identity problem. The purpose of the present invention is to solve these rigidity problems by attacking the root causes.

As their root causes are intertwined, the rigidity problems often appear concurrently. They should be solved simultaneously in one unified framework; that is an object of the present invention.

BRIEF SUMMARY OF THE INVENTION

It is, therefore, an object of the present invention to provide a system and methods to solve IP mobility problems, NAT traversal problems, and path identification problems in a unified framework.

Each connection is identified by a connection ID called CID, which is inserted into an IP packet through an IP option or payload encapsulation.

An overlay network of CID processing nodes called C-nodes is deployed to perform both data- and control plane functions. A connection is to send packets in multiple paths to multiple destinations via multiple IP networks.

CIDs can be globally unique by using an MAC (media access control) address as the main part of a CID. Otherwise, CIDs can be locally unique at C-nodes; a C-node reserves blocks of CIDs from immediate next nodes in the routes of outbound packets.

A soft switch is maintained at each C-node to perform CID-related operations, wherein CIDs and tetrads are switched or modified; packets are duplicated, generated, or discarded.

For each connection, at the first C-node of a connection, a CID is inserted into each packet received from the source; at the last C-node in a path, the CID of a packet is removed and the original tetrad of the connection is restored.

At each mobile host, a C-node is inserted; such a C-node is called a terminal C-node. Other C-nodes are called gateway or relay C-nodes and they are inserted at locations with public IP addresses. Gateway and relay C-nodes are to intercept packets traversing out of NATs; good locations are the egress and ingress points of autonomous and intermediate systems.

To solve NT-mobility joint problems, a C-node overlay performs two additional operations: acquiring public APs for hosts moved behind a NAT and forwarding them to where they are needed, and punching a hole at appropriate NATs.

The control plane of a C-node overlay enables gateway C-nodes to be re-deployed, adapting to uncertainties in terminals' moving.

BRIEF DESCRIPTION OF THE DRAWINGS

The above and other objects and features in accordance with the present invention will become apparent from the following descriptions of embodiments in conjunction with the accompanying drawings, and in which.

DETAILED DESCRIPTION OF EXEMPLARY EMBODIMENTS

Figures 1, 2:
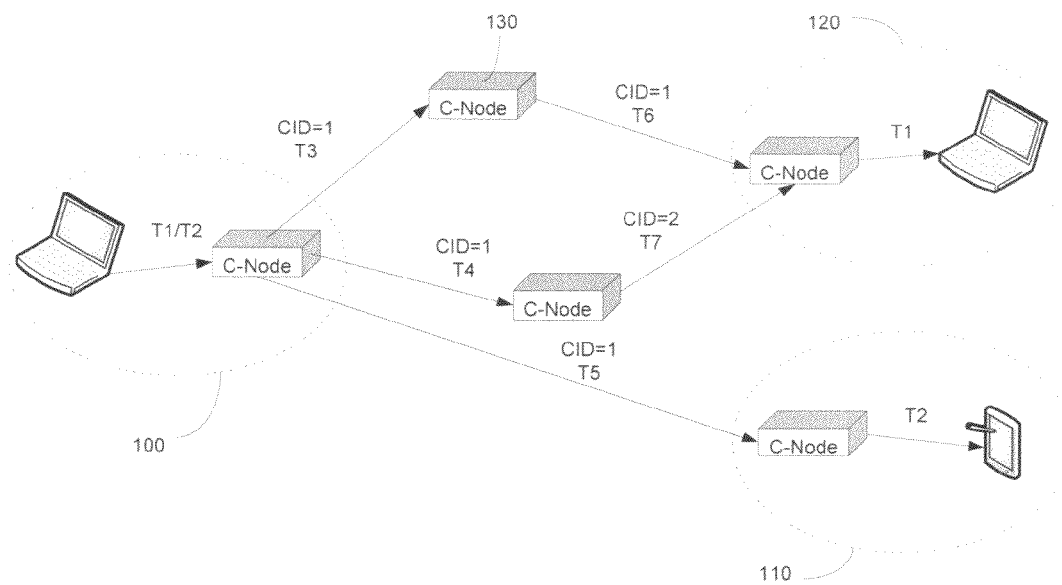
FIG. 1 illustrates a multi-path routing setup using a C-node overlay.
FIG. 2 illustrates the soft switch at a C-node.

To simplify description, the three problems: mobility, NT, and path-identity, will be jointly called IRP (IP rigidity problem). IRP will be solved in two models, PA (public-addressed) model and NA (NAT-addressed) model. In the PA model, all terminals have public IP addresses, and no NATs are present. The PA model is obviously an idealization; the solutions in the PA model serve as the basis for the solutions in the NA model. In real life, the PA model is approximated by 3G data networks wherein all terminals receive a public IP address. The solutions in the PA models are described first.

The key to the mobility problem is to correctly route packets in an IP connection when one or both end hosts change their points of attachment. As a convention, a source terminal is called an MT (mobile terminal), and a destination terminal is called a CT (corresponding terminal). This is simply a convention; a CT is also allowed to move. The mobility problem can be classified into two: single-sided (SS) mobility, wherein only the MT moves; double-sided (DS) mobility, wherein both the MT and the CT move.

The mobility problem can be further decomposed into Inbound (downstream) and Outbound (upstream) problems. The direction from a source to its destination is called outbound or upstream. Each problem can be further decomposed into a control-plane subproblem and a data-plane subproblem. Three subproblems are to be solved: UCP (upstream control problem), UDP (upstream data problem), and DDP (downstream data problem).

The purpose of UCP is to inform a CT or a CT's proxy of the new AP of a moved MT. Since an MT is fully aware of its own AP (new or old), there is no use for DCP. The purpose of UDP is to transfer data from the MT to the CT, and the purpose of DDP is to transfer data from the CT to the MT.

The present invention does not attack PIA directly; instead, it focuses on HLC. It turns out that elegant solutions for HLC actually solve both problems.

These solutions start with inserting an alternate connection ID (CID) into packets. A CID is designed to be location-invariant and route-invariant. No matter where a host moves and how a route is changed, the CID remains unchanged. Such design enables a clean separation between connection identification and routing (through changing APs). Further, PIA is solved as the CID system differentiates between a path and a connection.

An overlay network of CID processing nodes (C-nodes) is deployed to implement a set of functions called C-operations. A C-node is embodied by a software module. Architecturally, it can exist in three forms: hooking, layer 2.5, or router. In hooking, a packet is intercepted from a network stack, and after processing, modified packets or no packets are returned to the stack. A C-node can also be implemented as a layer 2.5 module, sitting between the MAC layer (layer 2), and the network layer (layer 3); or as a standalone or a micro-networked router.

A C-node is to perform two types of C-operation: packet operation (PO) and CID operation (CO). A C-node also performs a set of control-plane functions, to help set up and maintain a C-node overlay. A CID is inserted into an IP packet by two means: a new IP option, or encapsulation in the payload.

A packet operation (PO) is to receive an inbound packet and forward outbound packets, if any. In addition, an inbound packet may be discarded or duplicated in multiple copies, or a new outbound packet is generated.

A CID operation (CO) can be any of the following: (1) inserting a CID into a packet; (2) removing the CID from a packet; (3) modifying AP pairs inside a packet header; (4) modifying the CID in a packet. An IP packet with a CID will be called a C-packet.

There are at least two major differences between the present invention and an earlier invention by the same inventors called C-forwarding. The first main difference is that in C-forwarding, connections traversing the same C-node must have unique CIDs. This earlier design assumes that a C-operation is performed at every C-node which a C-packet traverses. However, in the current invention, this is no longer true. When a C-packet arrives at a C-node, if the C-node does not reside at the destination IP address in the header of the C-packet, no C-operations are performed.

It should be noted that, if a regular IP packet arrives at a C-node, C-operations can be performed on such a packet, independent of the destination IP address. For example, at a C-node inserted into a source terminal, all arriving packets will be turned into C-packets.

The second major difference is that in the original C-forwarding, a CID is never modified. However, in accordance with the present invention, a CID can be modified, as part of the C-operations.

Due to these differences, the uniqueness condition in the original C-forwarding invention is no longer needed. To define a new uniqueness condition, it is convenient define more terms.

A connection using a CID overlay for routing will be called a C-connection. Packets in a C-connection can travel in multiple paths to reach multiple destinations. The sequence of nodes on which a C-packet travels from a source to a destination is called a C-route. The sequence of C-nodes where C-operations are performed in a C-route is called a C-path. Thus, a C-route is a complete description of a route; while a C-path is a reduced representation of a C-route, being only a sequence of C-nodes.

A C-packet might arrive at a C-node which is not in its C-path; at such a C-node, no C-operations are performed. Such C-nodes are said to be inactive in the C-route. On the other hand, a C-node in a C-path is automatically active; correspondingly, at a C-node which is in a C-path, the C-path is said to be active.

Thus, a C-connection might have multiple C-routes, and on each C-route, multiple CIDs and tetrads. These new features enable packets in the same connection to travel in multiple paths, and to travel to specific nodes, making the present invention much more powerful than the original C-forwarding invention.

The new uniqueness condition is that active C-paths arriving (in the sense of C-packets) at the same C-nodes must have unique CIDs. Since at each C-node, not all arriving C-paths are active, the possibility of CID conflicts is greatly reduced. Therefore, CID assignment in accordance with the present invention becomes much easier and much more scalable.

The present invention also provides methods to assign completely local CIDs. In these methods, it is useful to differentiate between inbound CIDs and outbound CIDs. An inbound CID is the CID in a C-packet arriving at a C-node and a C-operation is performed on the arriving packet; an outbound CID is the CID in a C-packet leaving a C-node, after a C-operation. At C-node C1, another C-node C2 is said to be an outbound C-node if there is an active C-path leaving (in the sense of C-packets) C1 with the next node in the C-path being C2. At a C-node, a list of active outbound C-nodes is kept, and for each active outbound C-node, a block of reserved outbound CIDs is kept.

Through a reservation system, if all outbound CIDs are chosen from reserved CID blocks, there will be no confusion of inbound CIDs at any active outbound C-node. A control-plane maintenance system is also used to recycle reserved CIDs.

An alternate way to assign CIDs without any reservation is based on MAC addresses. Each host connected with an IP network owns a network interface, and each interface is associated with a MAC address. A MAC address is designed to be permanently and globally unique. A CID is formed by cascading a MAC address of a host with a few bits, called session bits, to differentiate concurrent applications on the same host. With 4 session bits, 32 concurrent applications are differentiated.

At each C-node, a soft switch called C-switch is maintained. A C-switch provides a mapping from inbound CID-tetrad pairs to outbound CID-tetrad pairs. In addition, a C-switch also stores information bits that indicate the kind of POs and COs to perform on C-packets. These information bits are set by the control plane of a C-node overlay. Alternately, these information bits are carried in C-packets, while this alternate system is costlier in bandwidth consumption.

To solve the mobility problem in the PA model, three steps are needed: (1) setting up a C-node overlay, (2) control-plane operations, and (3) data-plane operations.

The setup of a C-node overlay depends on the administrative rights and network environment. Often, a mobile host allows mobility software such as C-node to be inserted; but a server may not, due to security reasons. Three basic setup configuration is: (1) end-to-end (C-node in both the MT and the CT), (2) end-to-gateway (C-node in the MT, C-node in a gateway near the CT), and (3) gateway-to-gateway (C-node in a gateway near the MT, C-node in a gateway near the CT). It should be noted that, while a gateway works like a proxy, it can also function as a relay.

The main object of the control-plane of a C-node overlay is to set up, teardown, and maintain C-nodes. The tasks involve: assigning CIDs, setting up C-switches, obtaining new public APs for moved terminals, forwarding new APs to C-nodes where they are needed, etc. The new APs will be used for routing packets. At the last C-node in a C-path, the original tetrad is restored on all packets en route to the destination, thus keeping the original IP connection unbroken.

FIG. 1 shows a setup for multi-path-multi-network routing for a single connection. A C-node is inserted inside the laptop 100, which is to send packets to two terminals, another laptop 120 and a smart phone 110. Both the destinations 110 and 120 are inserted with a C-node. The smart phone 110 is connected via a 3G network, while the laptops 100 and 120 are connected via a Wi-Fi network. The laptop 100 has also a 3G antenna. This setup allows the laptop 100 to send data to two terminals in one single connection via two networks: Wi-Fi and 3G. The data from laptop 100 to laptop 120 is via two paths. In this setup, a C-node 130 serves as a gateway on a single path from terminal 100 to terminal 120. In this connection, the packets leaving laptop 100 may carry a tetrad T1 for laptop 120 or T2 for smart phone 110. Here T1 through T7 represent distinct tetrads.

FIG. 2 illustrates a C-switch with a switching table. The C-switch is located at a C-node with an ID at an IP address. The C-node serves as the ingress point for a C-path and the egress point for another C-path. Note that there are two CID rows with identical CIDs. These two CID rows have distinct T-ins (tetrads in inbound packets); representing two segments in transition from the same connection. For example, one segment traces back to an old location of an MT, and the other segment traces back to a new location of an MT. In the table, T-out entries are tetrads in outbound packets.

Figure 3:
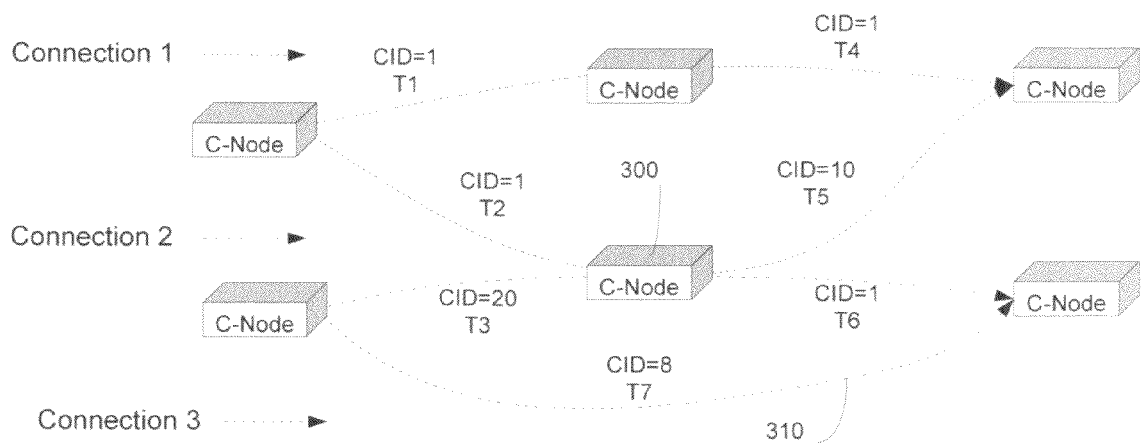
FIG. 3 shows how local CIDs are deployed without confusion.

FIG. 3 illustrates how local CIDs will not cause packets from different connections to be mixed up at C-nodes, for example, node 300. In this setup, connection 1 has two paths, while connections 2 and 3 have a single path; one of them is path 310.

Figure 4:
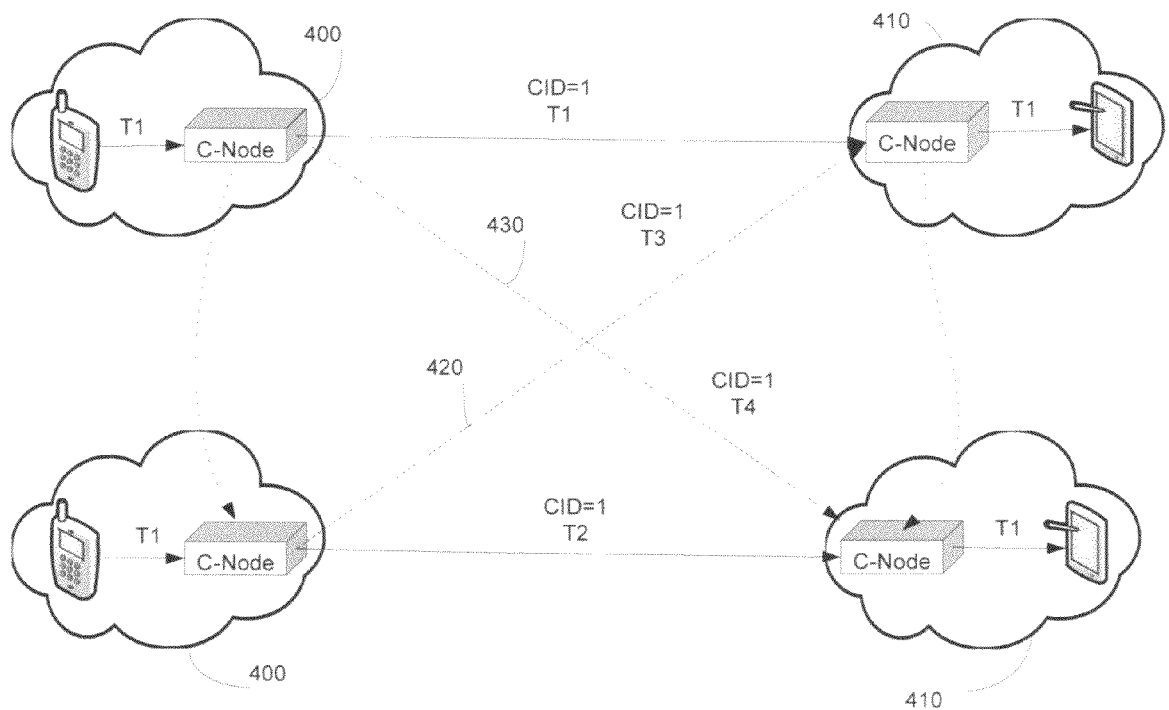
FIG. 4 shows an end-to-end setup solving a double-sided mobility problem in the PA model with a soft handoff.

FIG. 4 shows an end-to-end setup for a double-sided mobility problem in the PA model. In this setup, a smart phone 400 moves from one IP location to the next and a second terminal 410 also moves. The original tetrad for the single-path connection is T1. In this setup, the two terminals are equipped to perform soft handoffs; an original connection is kept alive while a new connection becomes online. Paths 420 and 430 represent the cross paths (from the new MT location to the old CT location and from the old MT location to the new CT location). Note that the original tetrad T1 is kept alive within both terminals. A new IP address of a moved terminal is sent to a corresponding terminal via one of the cross paths.

Figure 5:
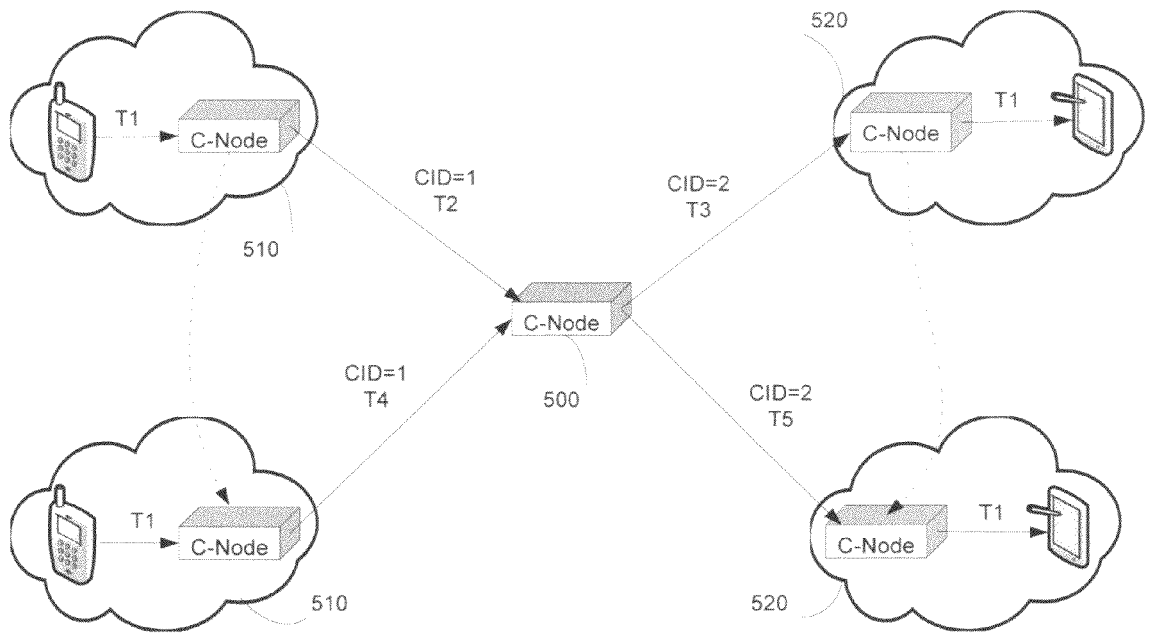
FIG. 5 shows a relay setup for a double-sided mobility problem in the PA model.

FIG. 5 shows a relay setup for a double-sided mobility problem. In this setup, only hard handoffs are possible—an old connection must break before a new connection is up. Here a relay C-node 500 serves as the rendezvous point for both terminals 510 and 520. C-node 500 will be the node to forward the new address of a moved terminal. A relay is necessary because there are no cross paths as in the soft handoff case in FIG. 4.

Next, solutions in the NA model are described. In the NA model, the new issue is NT. While there are four kinds of NAT (full cone, restricted cone, port-restricted cone, and symmetric), they can be reclassified into 2 groups: symmetric and non-symmetric. For a symmetric NAT, the mapping between a private AP and its public AP depends on the IP addresses of both hosts; for a non-symmetric NAT, the mapping only depends on the source IP address.

The fundamental issue in NAT traversal is blindness in AP mapping: a host behind a NAT does not know its AP outside the NAT; a host outside a NAT does not know the AP of a host behind the NAT. Once the mapping is known, a next step is to punch a hole in the NAT (to enable NAT traversal).

There are two classes of hole-punch methods: Out-In and In-Out. In the Out-In methods, a host outside a NAT punches a hole to reach a host behind the NAT; in the In-Out methods, a host inside (behind) a NAT punches a hole to allow a host outside the NAT to reach a host inside.

The Out-In methods require that the inside host is a server and the outside host is a client, according to the server-client model. Now, there are many methods for a client to initiate a connection to a server behind a NAT. Since a server is set up to serve clients, these methods are well established and well-known. In IRP, hole-punching is for an existing connection—no new connections are needed. Methods exist to fake a connection initiation so as to punch a hole only; no actual connections are to establish.

The In-Out methods are suitable for P2P (peer-to-peer) applications wherein the host inside a NAT is not required to be a server. In these methods, the host behind a NAT first sends a packet to reach the host outside. Then the host outside the NAT reverses the tetrad (reversing the roles of source and destination) and sends packets to traverse the NAT to reach the host inside.

To solve IRP in the NT model, two additional operations are needed: (a) obtaining unknown public APs (or AP mappings), and (b) hole-punching.

In accordance with one aspect of the present invention, if a terminal is mobile, then a C-node is inserted within the terminal. Such a C-node is called a terminal C-node.

A C-node placed at a critical network location outside a NAT that can intercept packets crossing the NAT is called a gateway C-node. In particular, for servers that prevent C-node software insertion, C-nodes must be placed outside of the NATs shielding the servers. A relay C-node is a special type of gateway C-node that serves also as a relay.

In a NT-mobility problem, it is necessary to obtain a new SAP outside a NAT for a moved MT. Once obtained, it will be forwarded to a C-node near a CT so that the packets from the CT can be routed correctly to the moved MT.

To obtain a public AP, first a NAT mapping has to be generated by sending a packet from the moved MT to traverse a NAT from behind. There are three ways: an MT sends out a C-packet to a CT, a gateway C-node, or a relay C-node. After the mapping has been generated, two methods can be used to obtain the new SAP. In method 1, the NAT is assumed to provide NAT-mappings upon request; the terminal C-node at the MT makes the request. One such NAT software is UPnP. In method 2, a C-node is inserted inside a NAT, and this C-node obtains the public AP and forwards it.

There are two cases of hole-punching: at the MT side and at the CT side.

For hole-punching at the MT side, if the NAT is non-symmetric, once the new public SAP has been obtained, it can be used to traverse the NAT. Therefore, hole-punching becomes trivial. If the NAT is symmetric, hole-punching is done by sending a packet from behind a NAT to a relay C-node outside the NAT.

For hole-punching at the CT side, if the CT is a server, then the methods based on the server-client model can be used. If the CT is not a server, then the methods used for the MT side can also be applied, by reversing the roles of the MT and the CT.

It is possible not to punch a hole. For example, if a CT is not moved, then packets with the original SAP will be able to traverse the NAT shielding the CT. In this case, a gateway or terminal C-node can simply change the SAP in the packets that need to traverse this NAT. This method, however, may cause packets to be dropped due to egress filtering in some routers. To prevent this, the modification to the original SAP must be done in a topologically correct way. Another example is a setup with a soft-handoff between the MT and the CT. A new SAP from a moved MT can be sent to a CT via an unbroken connection between the MT at the old address to the CT.

A good place to insert a gateway C-node is at the ingress and egress points of autonomous systems or intermediate systems. Thus, a gateway C-node should be placed into a border router, an access control router, a router in DMZ (demilitarized zone), a LAN-router, or a firewall-NAT box.

Figure 6:
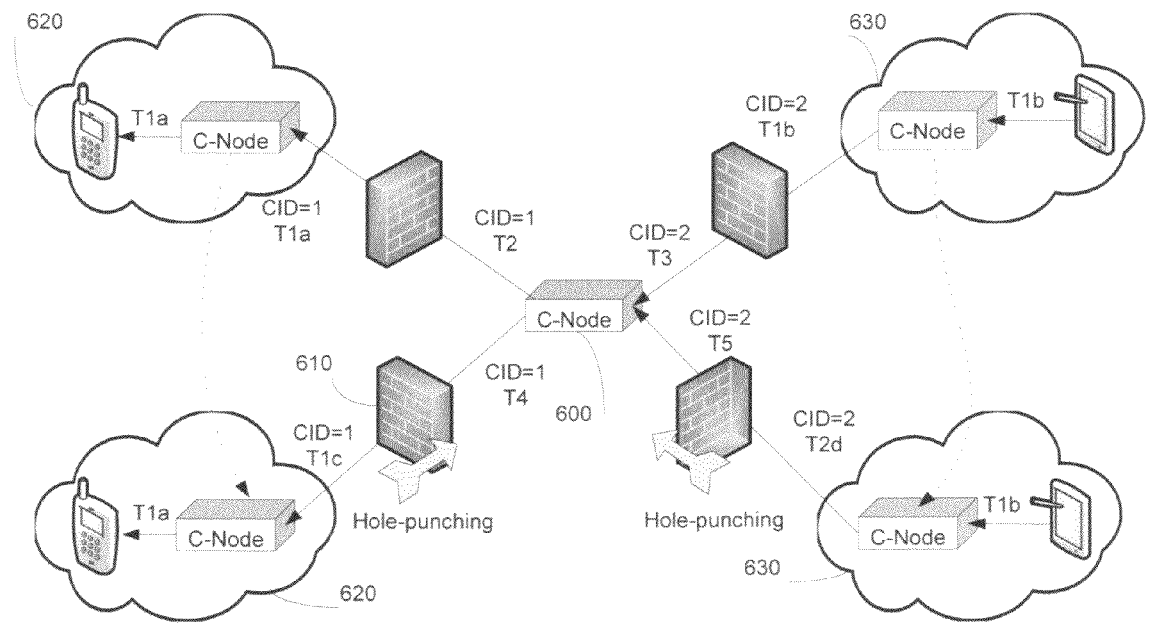
FIG. 6 shows a relay setup for a double-sided joint NT-mobility problem.

FIG. 6 illustrates the same setup as in FIG. 5 except that both terminals are now behind a firewall before and after moving. Again the relay C-node 600 serves as the rendezvous point. The new twist is that a hole must be punched from terminal 620 to reach the relay 600 after moving to the new location. Similarly, terminal 630 must punch a hole after moving to allow packets to travel to and from the relay 600. Note that if the relay 600 is located in one of the firewalls, then the segment from the firewall to the relay will not exist. For example, if the relay 600 is located in the firewall 610 shielding the moved terminal 620, then the segment represented by (CID=1, T4) will be immaterial.

Figure 7:
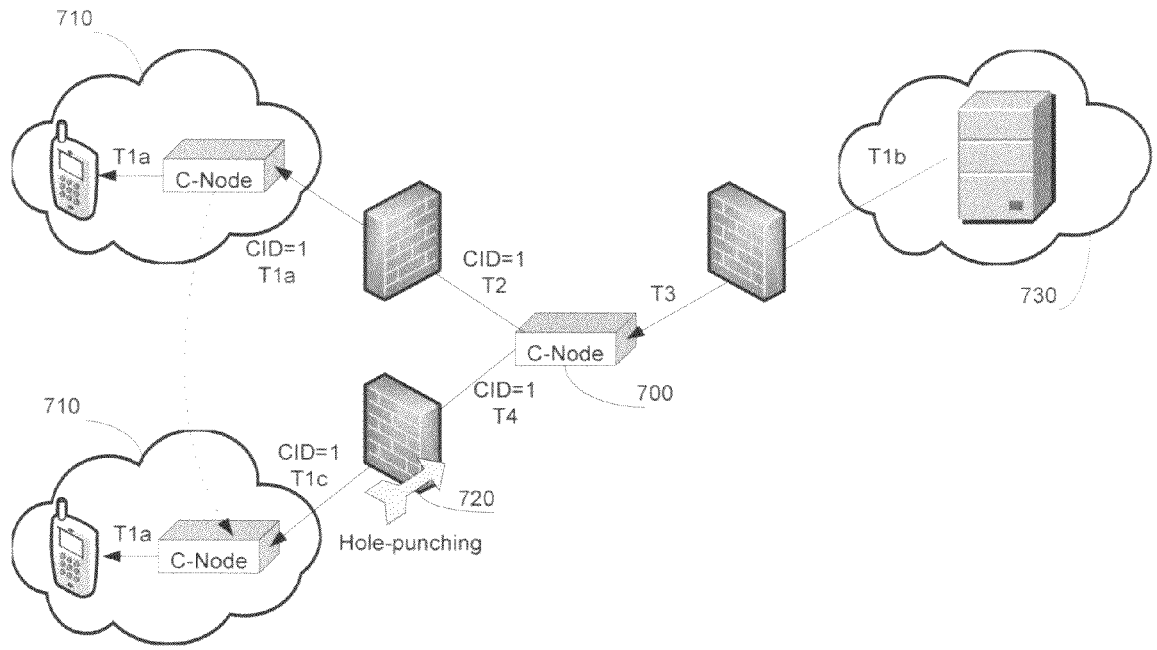
FIG. 7 shows a gateway setup for a single-sided NT-mobility problem.

FIG. 7 is a reduced setup to solve a single-sided NT-mobility problem. In this setup, the CT is a fixed server 730 with no C-node software inserted. The main difference between this setup and FIG. 6 is that there is no need to punch a hole on the firewall that shields the server. The reason is that the relay 700 has punched a hole in the original connection from terminal 710 to server 730.

Figure 8:
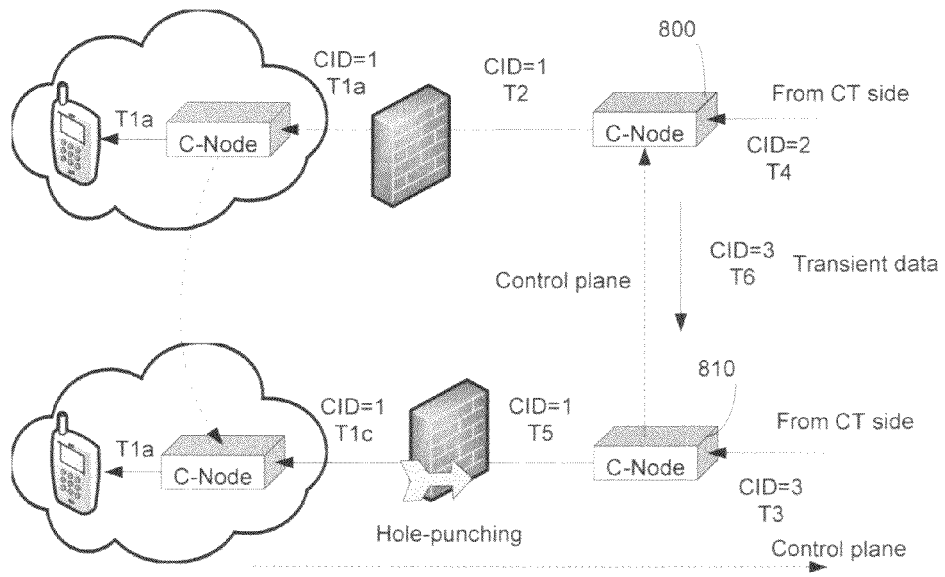
FIG. 8 illustrates a gateway C-node re-deployment.

FIG. 8 shows a gateway C-node re-deployment in serving the same connection. This can happen when a terminal makes a move away from an administrative domain. The original gateway C-node 800 is informed through a control plane action from the takeover gateway C-node 810. The remaining (transient) data traffic will be forwarded from C-node 800 to takeover C-node 810. The takeover C-node also has to inform the CT side C-nodes of the change in the gateway C-node for the MT.

What is claimed is:

1. A method to reduce IP (Internet protocol) rigidity in the problems of mobility, NAT (network address translation) traversal and explicit path identity, comprising:

setting up a plurality of overlay nodes, called C-nodes;
a C-node is software inserted into a host or a terminal;
a C-node is enabled in three alternate forms: hooking, layer 2.5 module, or router; wherein at a C-node, a connection ID (called CID) may be inserted into or removed from a packet; the CIDs inserted into the packets of a single IP connection are being the same; the CIDs are locally unique in that different IP connections crossing at the same C-node is uniquely differentiated by the CIDs; the CID may contain the MAC (media access control) address of a host or terminal;
wherein a soft switch called a C-switch is maintained at each C-node to perform a packet operation (PO) which is any combination of the procedures: (1) receiving an inbound packet, (2) generating an outbound packet, (3) dropping (deleting) an inbound packet, (4) replicating an inbound packet into multiple packets, or (5) forwarding an outbound packet; the PO may be dependent on the CID inserted in the inbound packet;
wherein the C-switch at each C-node also performs a CID-operation (CO) which is any combination of the procedures performed on an inbound packet: (1) inserting a CID into the packet, (2) removing a CID from the packet, (3) modifying the packet header, or (4) modifying a CID in the packet;
wherein at a C-node, any combination of POs and COs is performed on a packet arriving at the C-node only if the destination IP address in the packet is the same as the IP address of the host or terminal in which the C-node resides;
wherein only a select subset of C-nodes are allowed to perform COs or POs on packets arriving at the select C-nodes.

2. The method of claim 1, wherein a plurality of special C-nodes (called gateway C-nodes) is set up; each gateway C-node resides at a host or terminal with a public IP address; such a host or terminal may be the ingress or the egress point of an autonomous system or an intermediate system; at such a location, a NAT may be present.

3. The method of claim 2, wherein a host or terminal without an inserted gateway C-node may be associated with a specific gateway C-node, which is called the associated gateway C-node of the host or terminal.

4. The method of claim 3, wherein a host or terminal behind a NAT sends its packets to its associated gateway C-node from behind the NAT, in order to traverse the NAT.

5. The method of claim 4, a gateway C-node associated with a host or terminal may be re-associated through a control-plane action between the C-nodes and hosts or terminals.

6. A computer-readable non-transitory medium with a computer program for performing the methods as described in any one of claims 1 to 5.

* * * * *